United States Patent
Kaneko et al.

(10) Patent No.: US 12,340,503 B2
(45) Date of Patent: Jun. 24, 2025

(54) IMAGE PROCESSING APPARATUS

(71) Applicant: KYOCERA Document Solutions Inc., Osaka (JP)

(72) Inventors: Shiro Kaneko, Osaka (JP); Kanako Morimoto, Osaka (JP); Takuya Miyamoto, Osaka (JP); Naomichi Higashiyama, Osaka (JP)

(73) Assignee: Kyocera Document Solutions, Inc. (JP)

( * ) Notice: Subject to any disclaimer, the term of this patent is extended or adjusted under 35 U.S.C. 154(b) by 568 days.

(21) Appl. No.: 17/742,798

(22) Filed: May 12, 2022

(65) Prior Publication Data

US 2022/0375052 A1 Nov. 24, 2022

(30) Foreign Application Priority Data

May 20, 2021 (JP) ................................ 2021-085408

(51) Int. Cl.
*G06T 7/00* (2017.01)
*G06T 3/60* (2024.01)
(Continued)

(52) U.S. Cl.
CPC ............... *G06T 7/001* (2013.01); *G06T 5/20* (2013.01); *G06T 2207/30144* (2013.01); *G06T 2207/30168* (2013.01)

(58) Field of Classification Search
CPC . G06T 2207/30144; G06T 2207/30168; G06T 5/20; G06T 7/001; G06T 2207/10008
See application file for complete search history.

(56) References Cited

U.S. PATENT DOCUMENTS

| 11,636,611 B2* | 4/2023 | Wen ............................. G06T 7/30 |
| | | 382/131 |
| 2014/0050406 A1* | 2/2014 | Buehler ....................... G06T 7/20 |
| | | 382/191 |

(Continued)

FOREIGN PATENT DOCUMENTS

| CN | 113761259 A | * 12/2021 | |
| CN | 110766724 B | * 1/2023 | ............. G06T 7/248 |

(Continued)

OTHER PUBLICATIONS

Thibaud Ehret, "Image Anomalies: a Review and Synthesis of Detection Methods", Jun. 2019; Journal of Mathematical Imaging and Vision manuscript No. (will be inserted by the editor) (Year: 2019).*

*Primary Examiner* — Asghar H Bilgrami

(57) ABSTRACT

An image processing apparatus compares a target image and a reference image and thereby detects an anomaly in the target image, and includes an anomaly detecting unit. The anomaly detecting unit is configured to (a) generate a first characteristic map obtained by performing a filter process for the target image and a second characteristic map obtained by performing the filter process for the reference image, (b) derive a correction amount on the basis of a deviation between an object in the first characteristic map and an object in the second characteristic map, and (c) correct the target image and/or the reference image with the correction amount and thereafter compare the target image and the reference image and thereby detect an anomaly in the target image.

4 Claims, 12 Drawing Sheets

(51) Int. Cl.
    *G06T 5/20*          (2006.01)
    *G06T 5/70*          (2024.01)
    *G06T 7/90*          (2017.01)

(56) References Cited

U.S. PATENT DOCUMENTS

| | | | | |
|---|---|---|---|---|
| 2014/0184786 | A1* | 7/2014 | Georgeson | G01M 99/00 |
| | | | | 348/128 |
| 2017/0140516 | A1* | 5/2017 | Maher | G06V 10/758 |
| 2022/0100433 | A1* | 3/2022 | Tanaka | H04N 1/00087 |
| 2022/0375052 | A1* | 11/2022 | Kaneko | G06T 5/20 |

FOREIGN PATENT DOCUMENTS

| | | | |
|---|---|---|---|
| JP | 2016-206691 | | 12/2016 |
| JP | 2017017585 A | * | 1/2017 |
| WO | WO-2017017585 A1 | * | 2/2017 |

* cited by examiner

FIG. 8

|  | SMALL | MEDIUM | LARGE |
|---|---|---|---|
| HIGH | DRUM LEAK<br>PIN HOLE<br>DASH MARK | | |
| MEDIUM | CARRIER DEVELOPMENT<br>DRUM SCRATCH | TAILING | |
| LOW | | DRUM RUST CREST | |

EDGE STRENGTH (y-axis)
SIZE (x-axis)

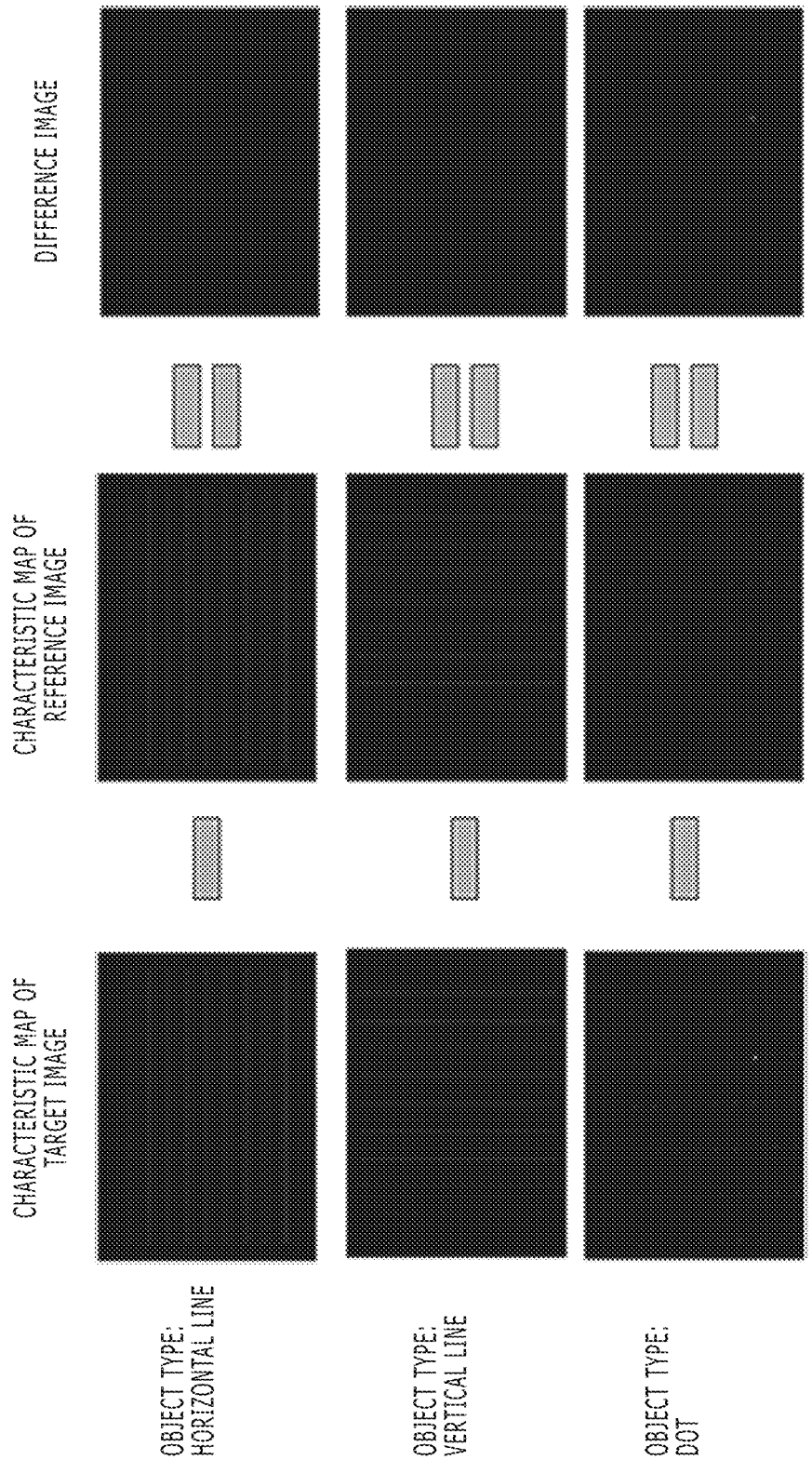

IMAGE PROCESSING APPARATUS

CROSS-REFERENCE TO RELATED APPLICATIONS

This application relates to and claims priority rights from Japanese Patent Application No. 2021-085408, filed on May 20, 2021, the entire disclosures of which are hereby incorporated by reference herein.

BACKGROUND

1. Field of the Present Disclosure

The present disclosure relates to an image processing apparatus.

2. Description of the Related Art

An image checking apparatus compares a reference image and a target image obtained by scanning a printed matter of the reference image with each other and checks the target image on the basis of a difference between the both images.

In this process, a registration marker is printed on the printed matter, a registration is performed between the target image and the reference image on the basis of the registration marker, and the difference between the both images is generated.

However, as mentioned, when such a registration marker is used for the registration between the target image and the reference image, it is required to exclude the reference marker to derive the difference, but if an object similar to the registration marker exists near the registration marker in the reference image, the registration may not be properly performed and consequently, an anomaly in the target image may not be properly detected.

SUMMARY

An image processing apparatus according to an aspect of the present disclosure compares a target image and a reference image and thereby detects an anomaly in the target image, and includes an anomaly detecting unit. The anomaly detecting unit is configured to (a) generate a first characteristic map obtained by performing a filter process for the target image and a second characteristic map obtained by performing the filter process for the reference image, (b) derive a correction amount on the basis of a deviation between an object in the first characteristic map and an object in the second characteristic map, and (c) correct the target image and/or the reference image with the correction amount and thereafter compare the target image and the reference image and thereby detect an anomaly in the target image.

These and other objects, features and advantages of the present disclosure will become more apparent upon reading of the following detailed description along with the accompanied drawings.

BRIEF DESCRIPTION OF THE DRAWINGS

FIG. 8 shows a diagram that explains a relationship between a characteristic amount and an anomaly cause;

FIG. 12 shows a diagram that indicates a difference image corresponding to the reference image and the target image shown in FIG. 11.

DETAILED DESCRIPTION

Hereinafter, an embodiment according to an aspect of the present disclosure will be explained with reference to drawings.

Figure 1:
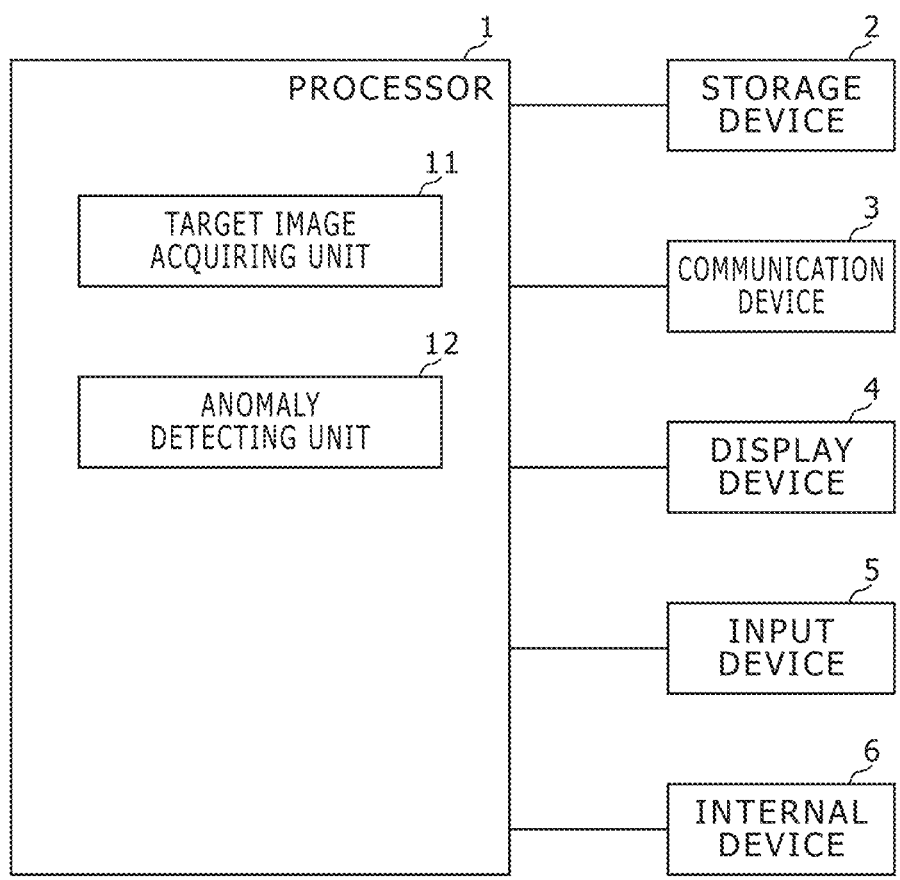
FIG. 1 shows a block diagram that indicates a configuration of an image processing apparatus according to an embodiment of the present disclosure.

FIG. 1 shows a block diagram that indicates a configuration of an image processing apparatus according to an embodiment of the present disclosure. An image processing apparatus shown in FIG. 1 is an information processing apparatus such as personal computer or server, or an electronic apparatus such as digital camera or image forming apparatus (scanner, multi function peripheral or the like), and includes a processor 1, a storage device 2, a communication device 3, a display device 4, an input device 5, an internal device 6 and the like.

The processor 1 includes a computer and executes an image processing program using the computer and thereby acts as sorts of processing units. Specifically, this computer includes a CPU (Central Processing Unit), a ROM (Read Only Memory), a RAM (Random Access Memory) and the like, and loads a program stored in the ROM or the storage device 2 to the RAM and executes the program using the CPU and thereby acts as specific processing units. Further, the processor 1 may include an ASIC (Application Specific Integrated Circuit) that acts as a specific processing unit.

The storage device 2 is a non-volatile storage device such as flash memory, and stores an image processing program and data required for a process mentioned below. The image processing program is, for example, stored in a non-transitory computer readable recording medium and installed into the storage device 2 from the recording medium.

The communication device 3 is a device that performs data communication with an external device, such as network interface or a peripheral interface. The display device 4 is a device that displays sorts of information to a user, such as a display panel of a liquid crystal display. The input device 5 is a device that detects a user operation, such as keyboard or touch panel.

The internal device 6 is a device that performs a specific function of this image processing apparatus. For example, if this image processing apparatus is an image forming apparatus, the internal device 6 is an image scanning device that optically scans a document image from a document, a printing device that prints an image on a print sheet and/or the like.

Here, the processor 1 acts as a target image acquiring unit 11 and an anomaly detecting unit 12, as the aforementioned processing units.

The target image acquiring unit 11 acquires a target image (image data) from the storage device 2, the communication device 3, the internal device 6 or the like, and stores the target image into the RAM. The target image is obtained by scanning a printed matter obtained by printing the reference image, for example.

The anomaly detecting unit 12 (a) generates a first characteristic map obtained by performing a filter process for the target image and a second characteristic map obtained by performing the filter process for the reference image, (b) derives a correction amount on the basis of a deviation (here, a coordinate difference and an angle difference, mentioned below) between an object in the first characteristic map and an object in the second characteristic map, and (c) corrects the target image and/or the reference image with the correction amount and thereafter compares the target image and the reference image and thereby detects an anomaly in the target image.

Specifically, the anomaly detecting unit 12 generates plural first characteristic maps and plural second characteristic maps obtained by performing plural filter processes corresponding to plural object types, derives a deviation between an object in the first characteristic map and an object in the second characteristic map for each of the object types, and derives the correction amount (for a whole of the target image or the reference image) on the basis of the deviation.

As these filter processes, a second derivative filter, a Gabor filter or the like is used, for example.

Figure 2:
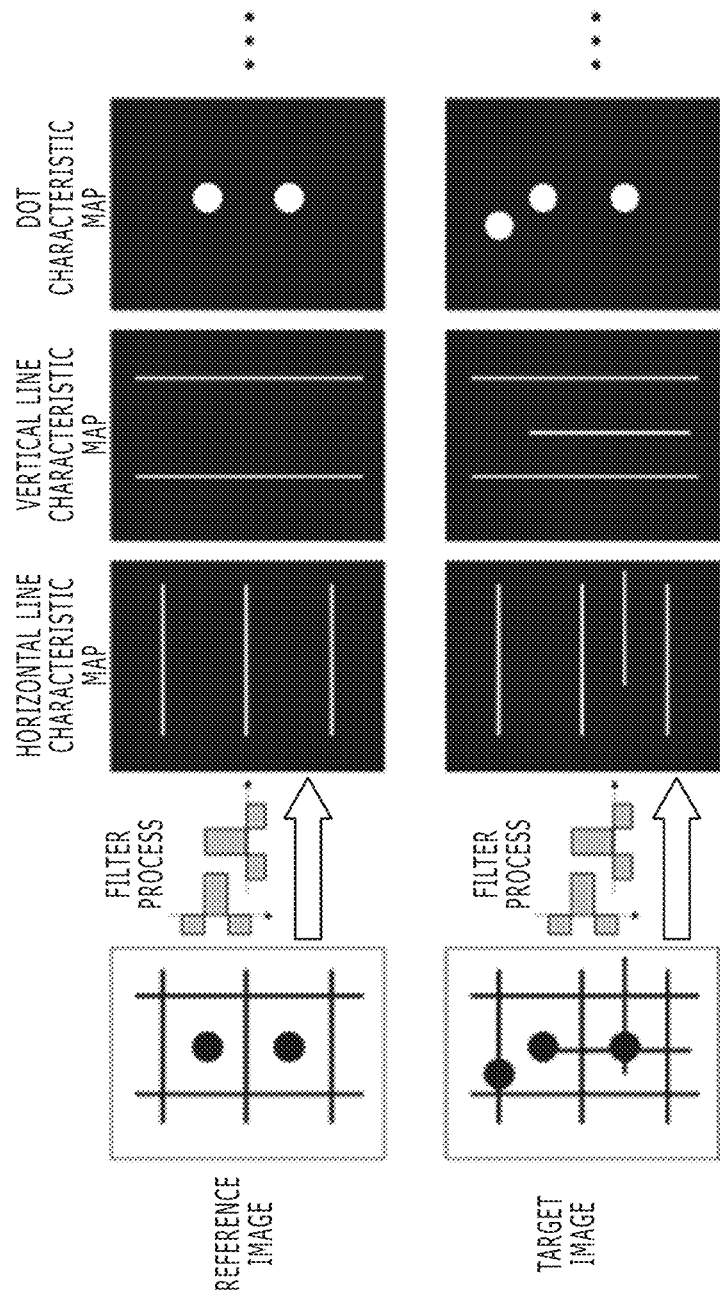
FIG. 2 shows a diagram that indicates an example of characteristic maps of plural object types.

FIG. 2 shows a diagram that indicates an example of characteristic maps of plural object types. As shown in FIG. 2, for example, the plural object types include "vertical line", "horizontal line", "dot" and the like; and for each of the object types, the characteristic maps of the reference image and the target image are obtained. For example, the filter process for "vertical line" uses a one-dimensional second derivative filter in a horizontal direction; the filter process for "horizontal line" uses a one-dimensional second derivative filter in a vertical direction; and the filter process for "dot" uses both a one-dimensional second derivative filter in a horizontal direction and a one-dimensional second derivative filter in a vertical direction.

Further, in this embodiment, the correction amount is derived on the basis of the coordinate differences and the angle differences of pairs of corresponding objects to each other between the first characteristic map and the second characteristic map.

Figure 3:
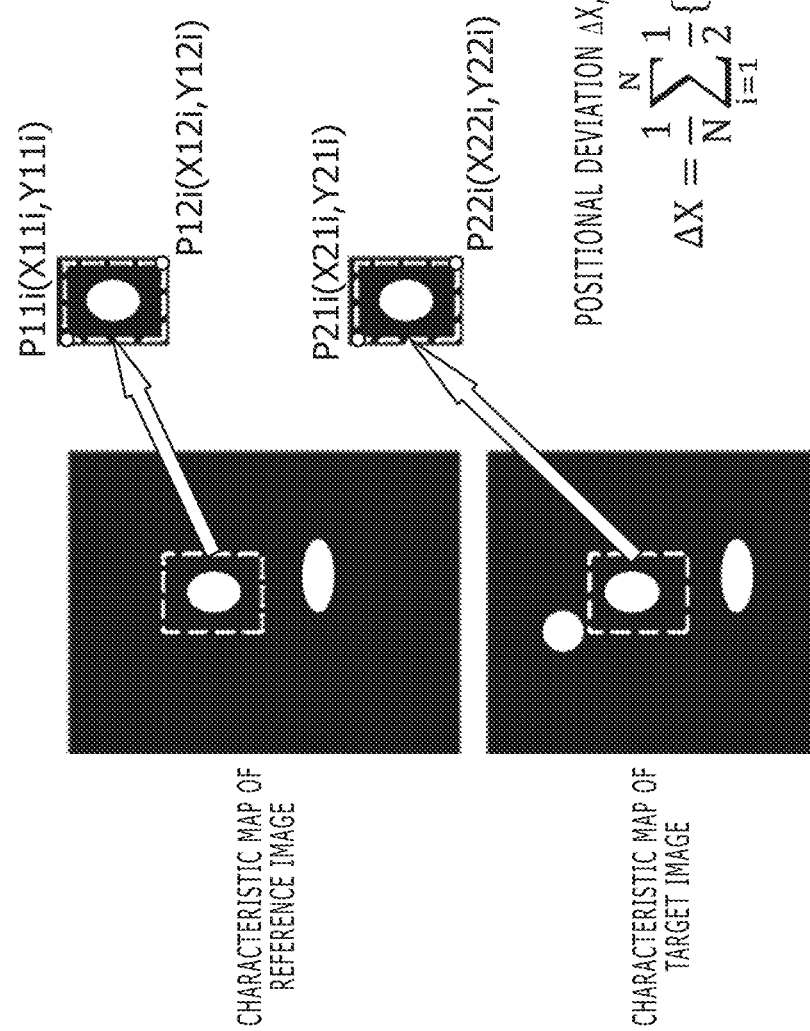
FIG. 3 shows a diagram that explains a coordinate difference between objects in the characteristic maps.

FIG. 3 shows a diagram that explains a coordinate difference between objects in the characteristic maps. Regarding the coordinate difference, as shown in FIG. 3, for example, rectangular areas including an objects i corresponding to each other in the reference image and the target image (e.g. circumscription rectangles of the objects) are determined; coordinate values $X11i$, $X12i$, $X21i$, $X22i$, $Y11i$, $Y12i$, $Y21i$, $Y22i$ in the horizontal direction (X axis direction) and in the vertical direction (Y axis direction) are determined of two-vertex pairs ($P11i$, $P12i$), ($P21i$, $P22i$) on respective diagonal lines of the rectangular areas; and an average value of the coordinate differences of all pairs of the objects i is calculated as a positional deviation ($\Delta X$, $\Delta Y$) between the reference image and the target image.

As well, regarding the angle difference, an angle difference of each pair of the corresponding objects i is determined, and an average value of the angle differences of all pairs of the objects i is calculated as an angular deviation $\Delta\Theta$ between the reference image and the target image. For example, when scanning such target image from a printed matter, such angular deviation sometimes occurs due to skew of the printed matter.

Figure 4:
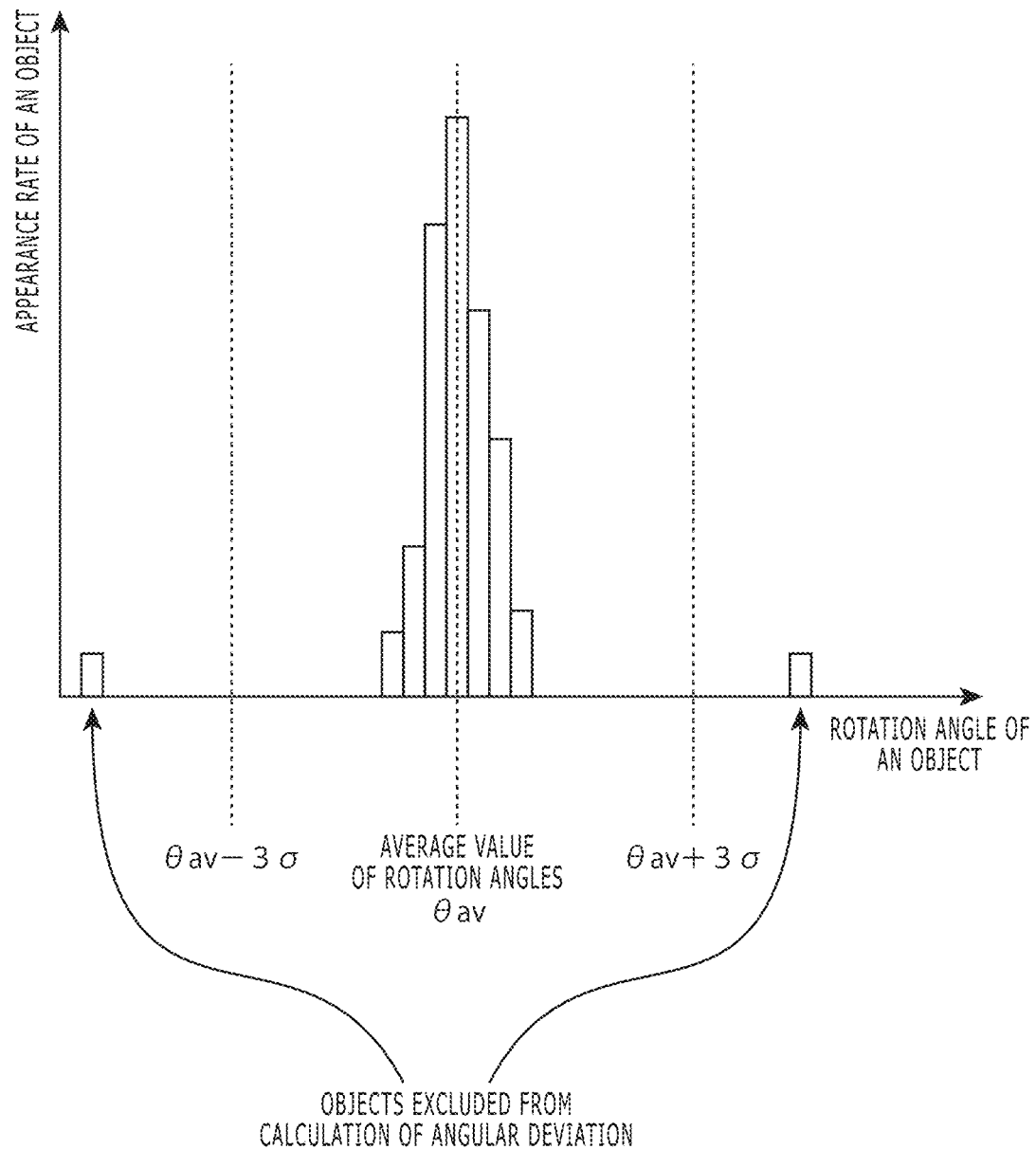
FIG. 4 shows a diagram that explains exclusion based on a rotation angle of an object in the characteristic map.

Here an object that individually rotates is excluded from the calculation of the angular deviation. FIG. 4 shows a diagram that explains exclusion based on a rotation angle of an object in the characteristic map. For example, as shown in FIG. 4, if an object has an angle difference (rotation angle) equal to or larger than a predetermined deviation (here a value of three times of the variance, for example) from an average value $\Theta av$ of the respective angle differences of objects, then this object is excluded from the calculation of the angular deviation.

Further, the anomaly detecting unit 12 derives a similarity ratio between an object in the first characteristic map and an object in the second characteristic map, and excludes an object of which the similarity ratio is less than a predetermined threshold value and thereafter derives the aforementioned correction amount.

Figure 5:
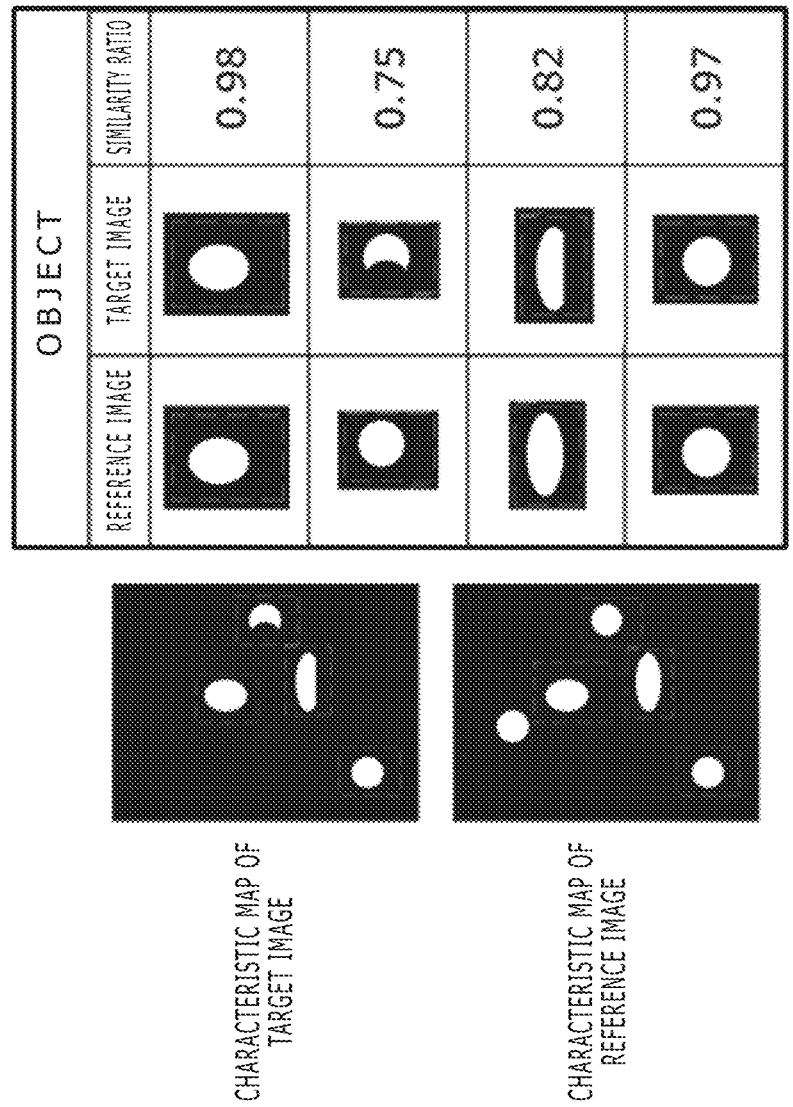
FIG. 5 shows a diagram that explains a similarity ratio between objects in the characteristic maps.

FIG. 5 shows a diagram that explains a similarity ratio between objects in the characteristic maps. For example, as shown in FIG. 5, the similarity ratio of each object pair is derived; if shapes of an object pair are completely identical, then the similarity ratio gets 1; the more the shapes are similar, the closer to 1 the similarity ratio gets; and if shapes of an object pair are completely different, then the similarity ratio gets 0. This similarity ratio is derived in accordance with an existent method. For example, for deriving this similarity ratio and the aforementioned characteristic map, an open source library such as OpenCV (Open Source Computer Vision Library) can be used.

Further, regarding the aforementioned angle difference, the object i is repeatedly rotated by a predetermined angle, and a rotation angle that the similarity ratio gets equal to or larger than a predetermined threshold value is determined as the angle difference of this object i.

Figure 6:
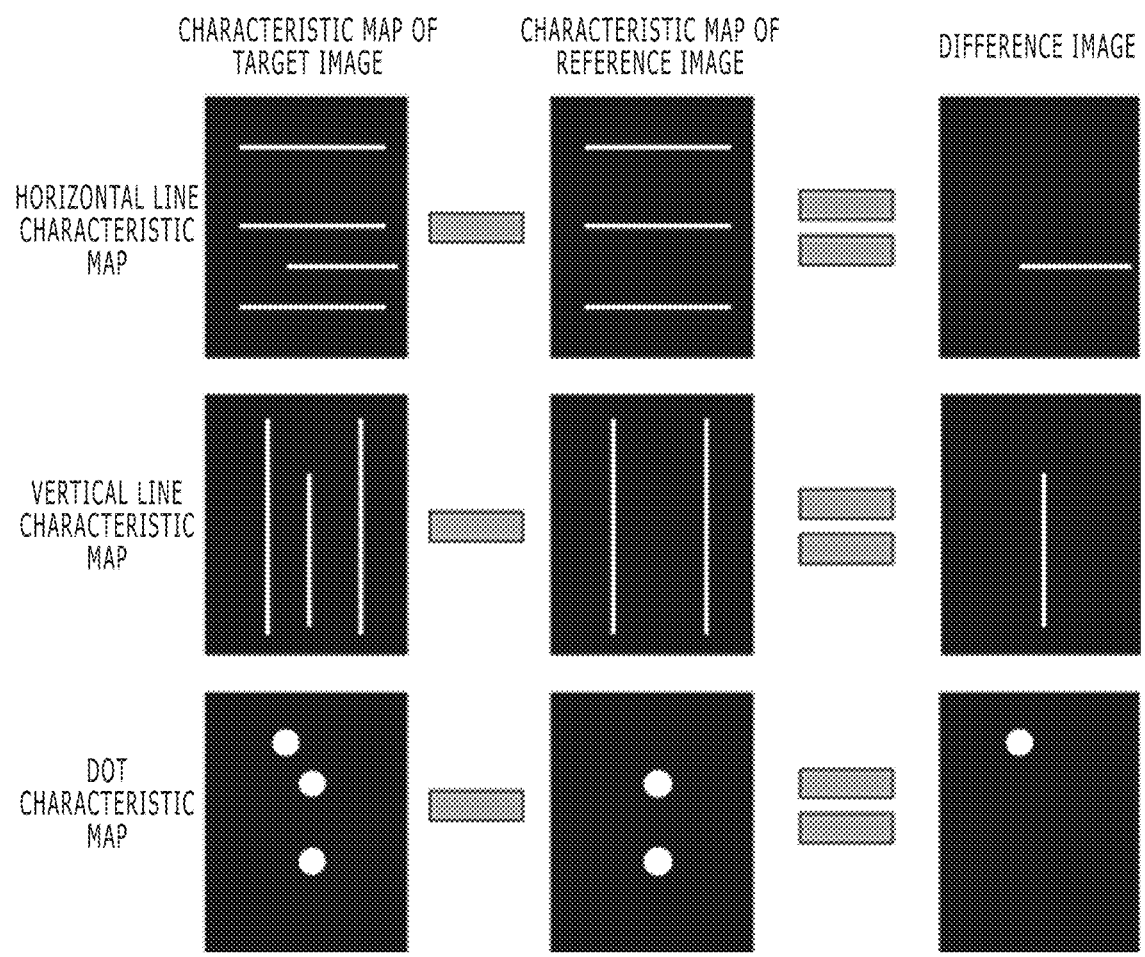
FIG. 6 shows a diagram that indicates an example of a difference image between the characteristic map of the target image and the characteristic map of the reference image.
Figure 7:
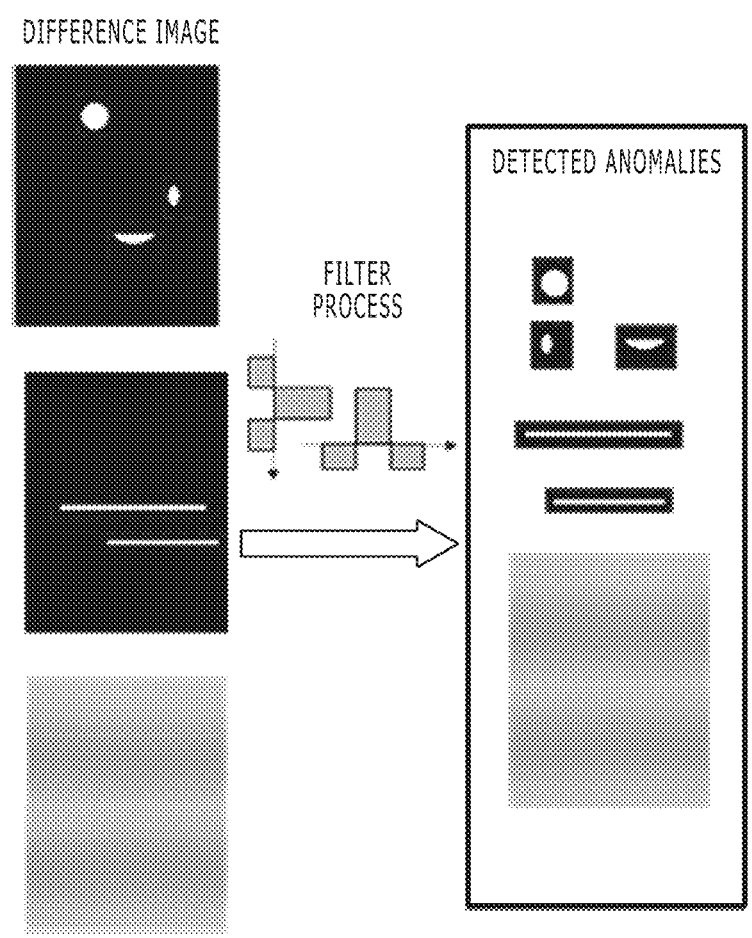
FIG. 7 shows a diagram that explains anomaly detection based on the difference image.

FIG. 6 shows a diagram that indicates an example of a difference image between the characteristic map of the target image and the characteristic map of the reference image. FIG. 7 shows a diagram that explains anomaly detection based on the difference image. For example, as shown in FIG. 6, the anomaly detecting unit 12 (a) corrects the target image and/or the reference image with the correction amount for each of the plural object types and thereafter generates respective difference images between the first characteristic maps and the second characteristic maps of the object types, and (b) detects an anomaly in the target image on the basis of the difference images of the object types. Here, this anomaly is detected as an object in the difference images (hereinafter called "anomaly object").

Therefore, when an object appears in the target image even though this object does not exist in the reference image or when a part or a whole of an object in the target image disappears or becomes fat, an anomaly object is detected. Further, a color unevenness analysis may be performed for the difference image, and as shown in FIG. 7, for example, color unevenness may be detected as an anomaly. In the color unevenness analysis, for example, regarding a median value of pixel values at a front end of the difference image as a reference, a deviation from the median value is derived of a pixel value of each pixel; a total of the deviations of all pixels in the difference image is derived as an unevenness level (characteristic amount mentioned below); and if a value of the unevenness level is equal to or larger than a predetermined threshold value, then a color unevenness anomaly is determined and detected.

Further, the anomaly detecting unit 12 determines a cause of the detected anomaly on the basis of a characteristic amount of the detected anomaly. FIG. 8 shows a diagram that explains a relationship between a characteristic amount and an anomaly cause.

For example, one or more characteristic amounts of an anomaly include(s) an area of the corresponding anomaly object, an orientation of the corresponding anomaly object, a prolonging direction of the corresponding anomaly object, a density of a part corresponding to the anomaly object, an edge strength of a part corresponding to the anomaly object, a color of a part corresponding to the anomaly object, a period of the corresponding anomaly objects, the number of the corresponding anomaly object(s), and/or the like; and an anomaly cause is determined from a value of the characteristic amount(s) of the anomaly on the basis of a relationship between a value range of each characteristic amount and an anomaly cause. Further, as shown in FIG. 8, for example, the anomaly cause may be determined on the basis of a combination of respective values of plural characteristic amounts. This relationship has been stored in this image processing apparatus in advance as a table or the like.

For example, the orientation of an anomaly object is a longitudinal direction of the anomaly object; the prolonging direction of an anomaly object is a prolonging direction that is determined from shapes of the anomaly object obtained at time points with a specific time interval; the density of a part corresponding to an anomaly object is (a) an average value or (b) a median value of densities of an anomaly object part in the target image corresponding to an anomaly object or (c) a difference value between the average value or the median value and an average value or a median value of densities of a part other than the anomaly object part in the target image; the edge strength of an anomaly object part is a density gradient at an edge of the anomaly object part in the target image; the color of an anomaly object part is a color at the anomaly object part in the target image; the period of anomaly object parts is a spatial period of the anomaly objects; and the number of anomaly object(s) is the number of anomaly object(s) of each object type.

For the detected anomaly, a predetermined anomaly treatment process may be performed. For example, the anomaly treatment process is notification of the detected anomaly (such as message transmission from the communication device or displaying a message on the display device 4 to an operator who is engaged in determination of a malfunction part corresponding to the detected anomaly or maintenance), automatic determination of a malfunction part corresponding to the detected anomaly, an automatic maintenance operation, and/or the like.

Figure 9:
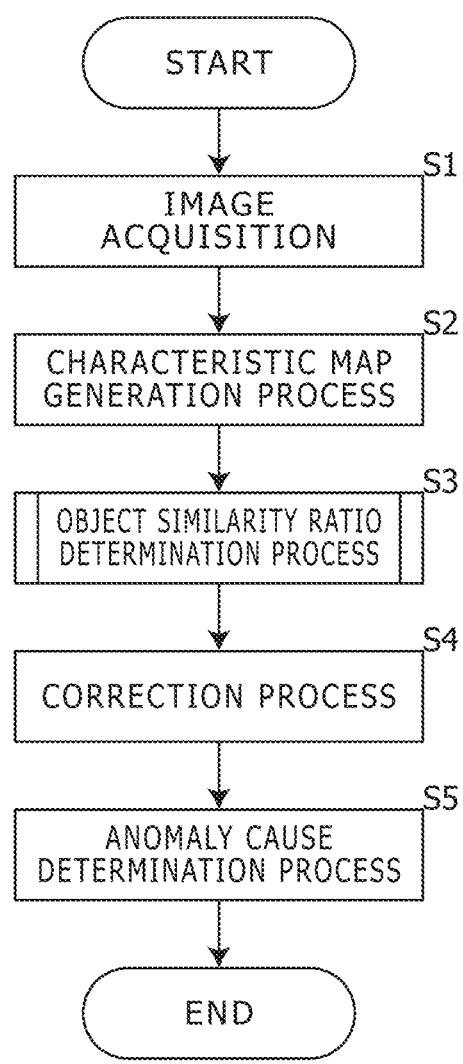
FIG. 9 shows a flowchart that explains a behavior of the image processing apparatus shown in FIG. 1.

The following part explains a behavior of the image processing apparatus in FIG. 1. FIG. 9 shows a flowchart that explains a behavior of the image processing apparatus shown in FIG. 1.

Firstly, the target image acquiring unit 11 acquires image data of a target image, and reads image data of a reference image that has been stored (in Step S1). If image data of the target image and the reference image has been stored in the storage device 2 or the like in advance, the image data of the target image and the reference image is simply read from the storage device 2 or the like.

Subsequently, the anomaly detecting unit 12 performs a predetermined filter process for the target image and the reference image and thereby generates one or plural characteristic maps (the image(s) after the filter process) of one or plural object types (vertical line, horizontal line, dot and the like) (in Step S2). If image data of the characteristic maps of the target image and the reference image has been stored in the storage device 2 or the like in advance, the image data of the characteristic maps is simply read from the storage device 2 or the like.

The anomaly detecting unit 12 performs the object similarity ratio determination process (in Step S3). In the object similarity ratio determination process, an object in the characteristic map of the reference image and an object in the characteristic map of the target image are determined; the similarity ration between them is determined; and the positional deviation and the angular deviation between the reference image and the target image are determined as the correction amounts.

Subsequently, the anomaly detecting unit 12 corrects a position and an angle of at least one of the reference image and the target image so as to cancel the positional deviation and the angular deviation (in Step S4), generates a difference image between the reference image and the target image after the correction, detects an anomaly object in the difference image, and determines a cause of the anomaly on the basis of a characteristic amount of the anomaly object (in Step S5). This characteristic amount may be derived using an existent open source library.

Figure 10:
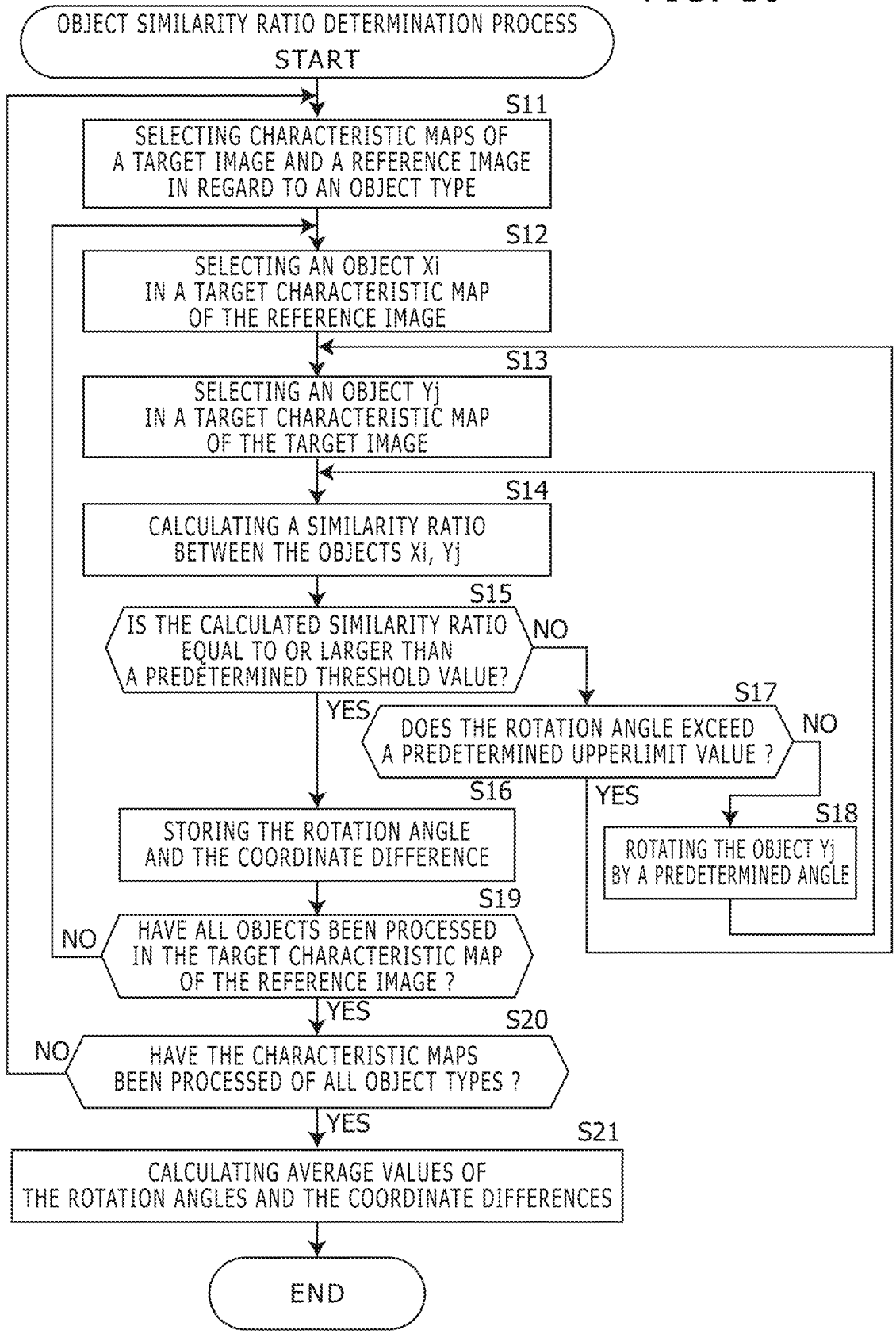
FIG. 10 shows a flowchart that explains an object similarity ratio determination process in FIG. 9.

Here explained are details of the object similarity ratio determination process (Step S3). FIG. 10 shows a flowchart that explains the object similarity ratio determination process in FIG. 9.

Firstly, the anomaly detecting unit 12 selects characteristic maps of the target image and the reference image of an object type as target characteristic maps (in Step S11).

Subsequently, the anomaly detecting unit 12 selects an object Xi in the reference image (i=1, . . . , M, M is the number of the objects Xi in the target characteristic map of the reference image) (in Step S12), and an object Yj in the target image (j=1, . . . , N, N is the number of the objects Yj in the target characteristic map of the target image) (in Step S13). The objects Yj are selected in the target image in the order of distance from a position of Xi in the reference image so as to earlier select the object Yj at a shorter distance from the position of Xi.

Subsequently, the anomaly detecting unit 12 calculates a similarity ratio between the selected objects Xi and Yj (in Step S14), and determines whether the similarity ratio is equal to or larger than a predetermined threshold value or not (in Step S15).

If the similarity ratio is equal to or larger than the predetermined threshold value, then the anomaly detecting unit 12 determines that the current object Xi and the current object Yj correspond to each other, and stores a coordinate difference between them (difference $\Delta Xi$ in the X direction and difference $\Delta Yj$ in the Y direction) and a rotation angle (angle difference) in the RAM or the like (in Step S16).

Contrarily, if the similarity ratio is not equal to or larger than the predetermined threshold value, then the anomaly detecting unit 12 determines whether the current rotation angle exceeds a predetermined upperlimit value or not (in Step S17); and if the current rotation angle does not exceed the predetermined upperlimit value, the anomaly detecting unit 12 further rotates the object Yj by a predetermined angle (in Step S18). The rotation angle of the object Yj is reset as zero when the object Yj is selected, and is repeatedly increased by the predetermined angle in Step S18. Returning to Step S14, the anomaly detecting unit 12 calculates a similarity ratio between the current object Xi and the rotated object Yj, and determines whether the calculated similarity ratio is equal to or larger than the predetermined threshold value or not. If the current rotation angle exceeds the predetermined upperlimit value at this time point, then the anomaly detecting unit 12 determines that the current object Yj does not correspond to the current object Xi, returns to Step S13, selects a next object Yj, and performs the same processes for this object Yj.

Thus, an object Yj corresponding to the selected object Xi is searched for and determined, and then a coordinate difference and an angle difference between them are stored.

Subsequently, the anomaly detecting unit 12 determines whether all objects Xi have been processed in the characteristic map of the reference image or not (in Step S19), and if at least one object Xi has not been processed (selected) yet, then returning to Step S12, the anomaly detecting unit 12 selects a next object Xi, and performs Step S13 and its subsequent processes as well for this object Xi.

As mentioned, regarding to the characteristic maps of the reference image and the target image, all pairs of the object Xi and the object Yj corresponding to each other are determined, and the similarity ratios, the coordinate differences, and the angle differences are determined and stored.

Subsequently, if all objects Xi have been processed in the current characteristic map, then the anomaly detecting unit 12 whether character maps of all object types have been processed or not (in Step S20); and if at least one object type has not been processed (selected), then returning to Step S11, the anomaly detecting unit 12 selects a next object type, and performs Step S12 and its subsequent processes as well for this object type.

As mentioned, regarding to all the object types, the aforementioned coordinate differences and the angle differences are determined and stored.

Subsequently, the anomaly detecting unit 12 calculates an average value of the stored coordinate differences as a positional deviation between the target image and the reference image, individually for the coordinate X and for the coordinate Y; and calculates an average value of the stored angle differences as an angular deviation between the target image and the reference image (in Step S21).

In this process, the coordinate difference and the angle difference of an object that has a similarity ratio less than a predetermined threshold value are excluded from the calculation of the positional deviation and the angular deviation. Further, as mentioned, if the angle difference of an object is away from an average value of angle differences in the characteristic map including this object by a predetermined value (distance), this object is excluded from the calculation of the positional deviation and the angular deviation.

The positional deviation and the angular deviation are calculated as mentioned, and the correction amounts are set as the calculated positional deviation and the calculated angular deviation.

Figure 11:
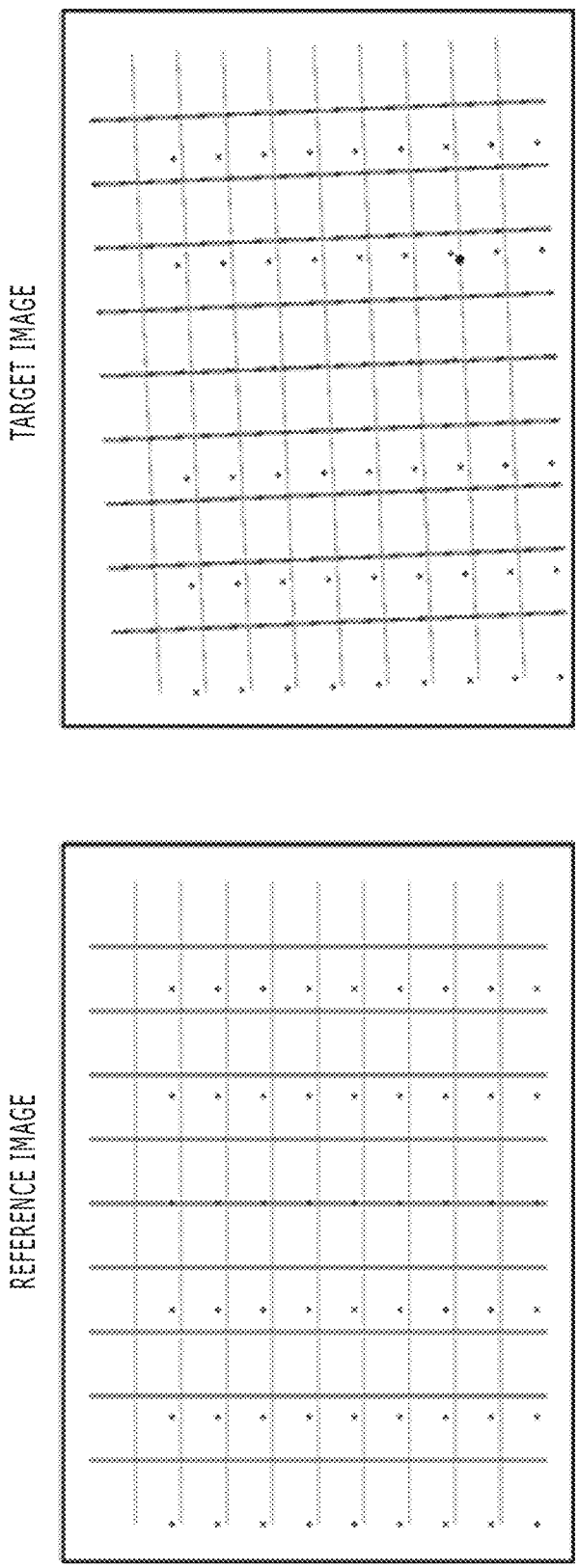
FIG. 11 shows a diagram that indicates a reference image and a target image corresponding to the reference image.

The next part explains a specific example. FIG. 11 shows a diagram that indicates a reference image and a target image corresponding to the reference image. This reference image and this target image are images of A4 size with 300 dpi as an image resolution, namely, images of 3507*2480 pixels. The actual positional deviations between them are 10 px in X coordinate and 50 px in Y coordinate, and the actual angle deviation is 2.5 degrees. This target image includes only one "dot" anomaly object.

FIG. 12 shows a diagram that indicates a difference image corresponding to the reference image and the target image shown in FIG. 11. As shown in FIG. 12, the difference image obtained through the aforementioned processes includes one "dot" anomaly object, and the anomaly object is properly distinguished from the other objects (i.e. the objects in the reference images) and detected.

Further, in this specific example, the threshold value of the similarity ratio is set as 0.85, and therefore, an object having a similarity ratio less than 0.85 is excluded from the calculation of the positional deviation and the angular deviation. Consequently, errors of the positional deviations in X and Y coordinates have become zero, and an error of the angular deviation has become 0.1 degree. Meanwhile, if the threshold value is not set (i.e. if the exclusion based on the similarity ratio is not performed), then errors of the positional deviations in X and Y coordinates are 2 pixels, and an error of the angular deviation is 0.8 degree. Thus, the exclusion based on the similarity ratio lowers the errors of the correction amounts (the positional deviations and the angular deviation).

As mentioned, in the aforementioned embodiment, the anomaly detecting unit 12 (a) generates a first characteristic map obtained by performing a filter process for the target image and a second characteristic map obtained by performing the filter process for the reference image, (b) derives a correction amount on the basis of a deviation between an object in the first characteristic map and an object in the second characteristic map, and (c) corrects the target image and/or the reference image with the correction amount and thereafter compares the target image and the reference image and thereby detects an anomaly in the target image.

Therefore, the deviations between the target image and the reference image are properly determined without using no registration markers for registration between them, and consequently, an anomaly is properly detected.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image processing apparatus that compares a target image and a reference image and thereby detects an anomaly in the target image, comprising
an anomaly detecting unit configured to (a) generate a first characteristic map obtained by performing a filter process for the target image and a second characteristic map obtained by performing the filter process for the reference image, wherein the filter process uses an object characteristic as a criteria; (b) derive a correction amount on the basis of a deviation between an object in the first characteristic map and an object in the second characteristic map, wherein the anomaly detecting unit will determine a similarity ratio between the object in the first characteristic map and the object in the second characteristic map and exclude an object with the similarity ratio less than a predetermined threshold value when deriving the correction amount and (c) correct the target image or the reference image with the correction amount and thereafter compare the target image and the reference image and thereby detect an anomaly in the target image.

2. The image processing apparatus according to claim 1, wherein the anomaly detecting unit generates plural first characteristic maps and plural second characteristic maps obtained by performing filter processes corresponding to plural object types, derives a deviation between an object in the first characteristic map and an object in the second characteristic map for each of the object types, and derives the correction amount on the basis of the deviation.

3. The image processing apparatus according to claim 2, wherein the anomaly detecting unit (a) corrects the target image or the reference image with the correction amount for each of the plural object types and thereafter generates difference images between the first characteristic maps and the second characteristic maps of the object types, and (b) detects an anomaly in the target image on the basis of the difference images of the object types.

4. The image processing apparatus according to claim 1, wherein the anomaly detecting unit determines a cause of the detected anomaly on the basis of a characteristic amount of the detected anomaly.

* * * * *